Patented Mar. 1, 1938

2,109,700

UNITED STATES PATENT OFFICE 2,109,700

METHOD OF PARTIAL OXIDATION OF HYDROCARBONS

Joseph Hidy James, Pittsburgh, Pa., assignor to Clarence P. Byrnes, Trustee

No Drawing. Application July 27, 1933, Serial No. 682,466

9 Claims. (Cl. 260—116)

In several patents, including Reissue Patent No. 18,522 of July 12, 1932, and several copending applications including Ser. No. 272,567, filed January 22, 1919 now Patent #2,085,221 and Ser. No. 435,355, filed January 6, 1921 now Patent #2,054,571, I have disclosed vapor-phase partial-oxidation of hydrocarbons at relatively high temperatures; especially of the aliphatic or naphthenic type, such as present in mineral, shale oil and the oils from low temperature distillation of coal, whether saturated or unsaturated; preferably in the presence of a catalyst. Such methods have the advantage of extremely rapid attack, a certain percentage of conversion being obtained in time intervals of seconds or fractions thereof; as compared with hours when carried out in ordinary liquid phase partial oxidation of the same hydrocarbons.

The complex condensed mixtures from such vapor-phase process contain oxygen derivatives ranging from alcohols through aldehydes, aldehyde alcohols, ketones, etc. to oxygenated organic acids: and when petroleum fractions are treated, these bodies are present in different molecular weights. There also occurs some dehydrogenation and thermal decomposition of higher molecular weight bodies, especially of the oxygenated bodies.

Some of the compounds thus formed have peculiar or objectionable odors and often color; and some bodies present readily polymerize and resinify, thus contaminating certain products such, for example, as soaps when made directly therefrom. Such vapor phase processes may be and have been carried out under subatmospheric, atmospheric and superatmospheric pressures, and with one or more catalytic contacts; and where more than one contact was used, with addition of more gas containing free oxygen between such catalytic contacts, and with and without steam, or other diluent, such as flue gas. Such processes have been usually carried out with temperatures above that of vaporization of the oil fraction treated and preferably between 225° C. and 500° C. and normally between 250° C. and 450° C.

I have discovered that objectionable features of the products of vapor phase oxidation may be overcome and at the same time further oxidation may be advantageously obtained by subjecting the condensed product thereof, particularly the oily product which is non-soluble or sparingly soluble in water: to a liquid phase partial oxidation at a relatively lower temperature than that in the vapor phase treatment, and preferably at a considerable or high superatmospheric pressure. During this second step the liquid treated is preferably well agitated, as for example, by means of the compressed air or other gas containing free oxygen used in the partial oxidation.

I have found that the vapor-phase catalytic oxidation at higher temperature acts to "open up" the originally chemically inert hydrocarbons and to prepare them in a remarkable manner for liquid phase oxidation, facilitating and greatly shortening such second step.

The second step consists of oxidizing the vapor phase product with air, oxygen or a gas containing it, at temperatures so low, especially under the superatmospheric pressures used, that for all practical purposes it may be termed liquid phase oxidation, although the product treated is preferably agitated or finely divided during this step.

Due to the "opening up" or preparatory action of the vapor phase oxidation step, the molecules of the product are susceptible to further attack, whether saturated or unsaturated, and objectionable polymerizing or resinifying does not occur to any objectionable extent. Alcohols and other oxygenated bodies short of acids are substantially all carried over to oxygenated acids, while the original oxygenated acids are in most cases converted into dibasic acids of good color and odor.

The liquid phase oxidation step may be carried out by the batch system or continuously. In the following examples, I employed the batch system using a pressure reaction bomb having at its top an exit pipe provided with a reducing valve acting to bring the escaping surplus air and gas (mainly oxygen and nitrogen) to atmospheric pressures. A two-stage air compressor was connected by a high pressure tubing, having a back seating check valve, to an air tube extending down to near the bottom of the bomb within about one-fourth inch thereof. This bomb was immersed in a suitable liquid heating bath, petrolatum being generally used therefor and kept at a substantially even desired temperature. The capacity of the compressor at 200 atmospheres gauge pressure was 17 liters of air per minute; and at 150 atmospheres was 8.5 liters per minute. In the first example, the material treated was "wax distillate" treated by my vapor phase catalytic air process above referred to. The oily mixture produced had a saponification number of 8.52 and contained approximately 27% of saponifiable material by volume.

With the compressor delivering air at the rate of 17 liters per minute, 100 cc. of this total oily mixture was treated for thirty minutes at 100 atmospheres per sq. in. gauge pressure, at a temperature of 150° C.

There resulted a recovery of about 96% of oily liquid of increased viscosity about the consistency of glycerine, with about 31% by volume of saponifiable matter and a saponification number of 26.20 mg. KOH per gram. The odor was improved over that of the material oxidized. There was little change in color.

These results show a marked increase in acid content over that of the product of the first step.

In the next or second test run, the same raw material was used, all conditions being the same as in run No. 1, except that the time was doubled. In this case, the volume recovery was 94%. The saponifiable matter by volume was 50%. The product was an oily liquid somewhat more viscous than ordinary engine oil and of a brown color. The odor was sweetish with some odor of acetic acid. The saponification number was 61.47 mg. KOH per gram.

In the third run, the effect of increasing the air pressure was tried, in a run of one hour, the air pressure being 150 atmospheres gauge pressure per sq. in. The same raw material was used and the same conditions, as in test No. 1, the air passing up through the liquid at 8.5 liters per minute. The result was a thick oily liquid pouring slowly and of brown color. The odor was sweetish with some odor of acetic and butyric acids. The volume recovery was 90%, the saponifiable matter by volume 83%, and the saponification number 105.4 mg. KOH per gram. This test run showed the best conditions of the runs on the material used and such conditions vary according to the particular partly oxidized material treated. When the same raw material was treated under the same conditions as run No. 1, except that the bomb heating bath was kept at 200° C., there resulted a slow sooty combustion of the oxidized mixture in the bomb.

In order to compare these above results with those obtained by applying the second step directly to straight hydrocarbons, I used in test No. 4 the same conditions as in test No. 1, but applied this second step to the original wax distillate used in the vapor phase oxidation to obtain the material treated in the preceding tests. The result was a volume recovery of 97%. The product was of a light red color, substantially no odor, saponification No. 1.78 mg. KOH per gram, and saponifiable matter by volume 8%. These results show very slight attack on the straight hydrocarbons of the fraction treated.

In another test, No. 5, I repeated test No. 4, except that the temperature was kept at 200° C. With a volume recovery of 97%, the resulting oily mixture was of reddish color, the odor slightly acidic, apparently from organic acids of low molecular weight, the saponification matter by volume 15% and the saponification number 12.55 mg. KOH per gram.

Tests Nos. 4 and 5 show the remarkable results gained by applying a vapor phase catalytic oxidation prior to air pressure oxidation in the liquid phase.

The following runs show the application of my plural step method to a kerosene:

Run No. 6, I used Venezuelan kerosene, which had been subjected to my vapor phase catalytic air oxidation. This material contained 23% of saponifiable matter by volume and its saponification number was 16.38 mg. KOH per gram.

Since a preliminary run had shown that a temperature of 150° C. was too high at 100 atmospheres pressure in the second step: this run was made at 100 atmospheres gauge pressure and a temperature of 125° C. The volume of oily material put in the bomb was 100 cc. The result was 94% by volume of an oily liquid of reddish orange color, having some odor of acetic and butyric acids and no aldehyde odor. The saponification matter by volume was 40% and the saponification number was 82.19 mg. KOH per gram.

This sixth run showed that the two-step method is applicable to the production of organic acids from kerosene hydrocarbons.

The advantages of my invention result from treating the condensed liquid oxidized product resulting from relatively higher temperature oxidation of hydrocarbons, such as vapor phase treatment, by a lower temperature or "liquid phase" oxidation. In this way, the speed of obtaining the desired degree of oxidation is much increased over that of liquid phase oxidation of hydrocarbons; while the disadvantages of vapor phase treatment are reduced or largely overcome. The preparing or "opening up" action of the first higher temperature treatment greatly reduces the time of the second or liquid phase treatment. The mixture treated by the second step contains various oxygen derivatives of different degrees of oxidation, each class in different molecular weights, and usually unsaturated bodies. In the second step, the further oxidation is effected at lower temperature, preferably in liquid phase and further oxidation proceeds rapidly as compared to usual liquid phase oxidation of straight hydrocarbons. The objectionable characteristics of the oxidation product treated are also improved. Substantially all oxygenated material is carried over to acids and aldehydic odors are removed as also those of unsaturated bodies.

The acids produced in the first step may be removed by saponification or otherwise before using the second step. The original hydrocarbon used may be cracked or uncracked. The temperature and other factors may be varied in either or both steps, any pressure may be used in the first step and the superatmospheric pressure may be varied in the second step.

The product of the first step may be fractioned and a fraction thereof treated by the second step. The final product may be fractioned preparatory to further treatment. The unoxidized portion or less oxidized portions may be removed and retreated by either or both steps. The process may be applied to aromatic or cyclic hydrocarbons. The raw material may be widely varied, the second step may be carried out as a continuous one or by the batch system, and other changes may be made, without departing from my invention.

I claim:

1. In the method of improving an oily portion of condensed product of vapor phase oxidation of aliphatic hydrocarbon, the step consisting of subjecting said oily portion while in liquid phase to the action of free oxygen while under pressure on the order of at least 100 atmospheres.

2. In the method of improving an oily portion of condensed product of vapor phase oxidation of aliphatic hydrocarbon, the steps consisting of removing acids, and then subjecting the said oily portion in liquid phase to the action of free oxygen while under pressure on the order of at least 100 atmospheres.

3. In the method of improving an oily portion of the condensed product of vapor phase oxidation of mainly aliphatic hydrocarbon, the steps consisting of subjecting said oily portion in liquid phase to free oxygen under pressure on the order of at least 100 atmospheres, and then fractioning the product.

4. In the method of improving an oily portion of the condensed product of vapor phase oxidation of mainly aliphatic hydrocarbon, the step consisting of subjecting said oily portion in liquid phase to agitation and to the action of free oxygen under pressure on the order of at least 100 atmospheres.

5. In the method of improving an oily portion of the condensed product of vapor phase oxidation of mainly aliphatic hydrocarbon, the steps consisting of subjecting said oily portion in liquid phase to agitation and to the action of free oxygen under pressure on the order of at least 100 atmospheres, and supplying oxygen under pressure thereto in a continuous manner.

6. In the method of improving an oily portion of the condensed product of vapor phase oxidation of mainly aliphatic hydrocarbon, the steps consisting of subjecting said oily portion in liquid phase to a gas containing free oxygen under pressure on the order of at least 100 atmospheres and agitating the same by supplying the said gas under pressure.

7. In the method of improving an oily portion of the condensed product of vapor phase oxidation of mainly aliphatic hydrocarbon, the steps consisting of subjecting said oily portion in liquid phase to a gas containing free oxygen under pressure on the order of at least 100 atmospheres, agitating the same by supplying the said gas under pressure, and tapping off excess pressure during the treating step.

8. In the method of improving an oily portion of the condensed product of vapor phase oxidation of mainly aliphatic hydrocarbon, the step of subjecting said oily portion in liquid phase to the action of a gas containing free oxygen as the sole reactive component while under pressure on the order of at least 100 atmospheres.

9. In the partial oxidation of mainly aliphatic hydrocarbons, the steps consisting of treating the same in vapor or gaseous phase with a gas containing free oxygen at a relatively lower pressure and a temperature of over 250° C., and then treating the same in liquid phase with free oxygen at a relatively higher pressure on the order of at least 100 atmospheres.

JOSEPH HIDY JAMES.